June 8, 1943.  J. G. LEWIS  2,321,033
RECTOBLIQUE PLOTTER
Filed May 27, 1942   3 Sheets-Sheet 1

James G. Lewis INVENTOR
BY [signature]
ATTORNEY

June 8, 1943.　　　　J. G. LEWIS　　　　2,321,033
RECTOBLIQUE PLOTTER
Filed May 27, 1942　　　　3 Sheets-Sheet 2

James J. Lewis
INVENTOR
BY J. Mothershead
ATTORNEY

June 8, 1943.  J. G. LEWIS  2,321,033
RECTOBLIQUE PLOTTER
Filed May 27, 1942  3 Sheets-Sheet 3

James G. Lewis
INVENTOR
BY J. Smotherhead
ATTORNEY

Patented June 8, 1943

2,321,033

UNITED STATES PATENT OFFICE 2,321,033

RECTOBLIQUE PLOTTER

James G. Lewis, Siloam, Ga.

Application May 27, 1942, Serial No. 444,699

17 Claims. (Cl. 33—1)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention pertains to improvements in map plotting devices which I choose to refer to as rectoblique plotters.

The purpose of the device is to determine the horizontal angles from the nadir point of high oblique aerial photographs of a given terrain and the vertical angles thereof at the camera station for plotting topographic and planimetric maps.

The foregoing and other objects of the invention and the details of an embodiment thereof will become apparent from the following specification and accompanying drawings, in which.

Figure 4:
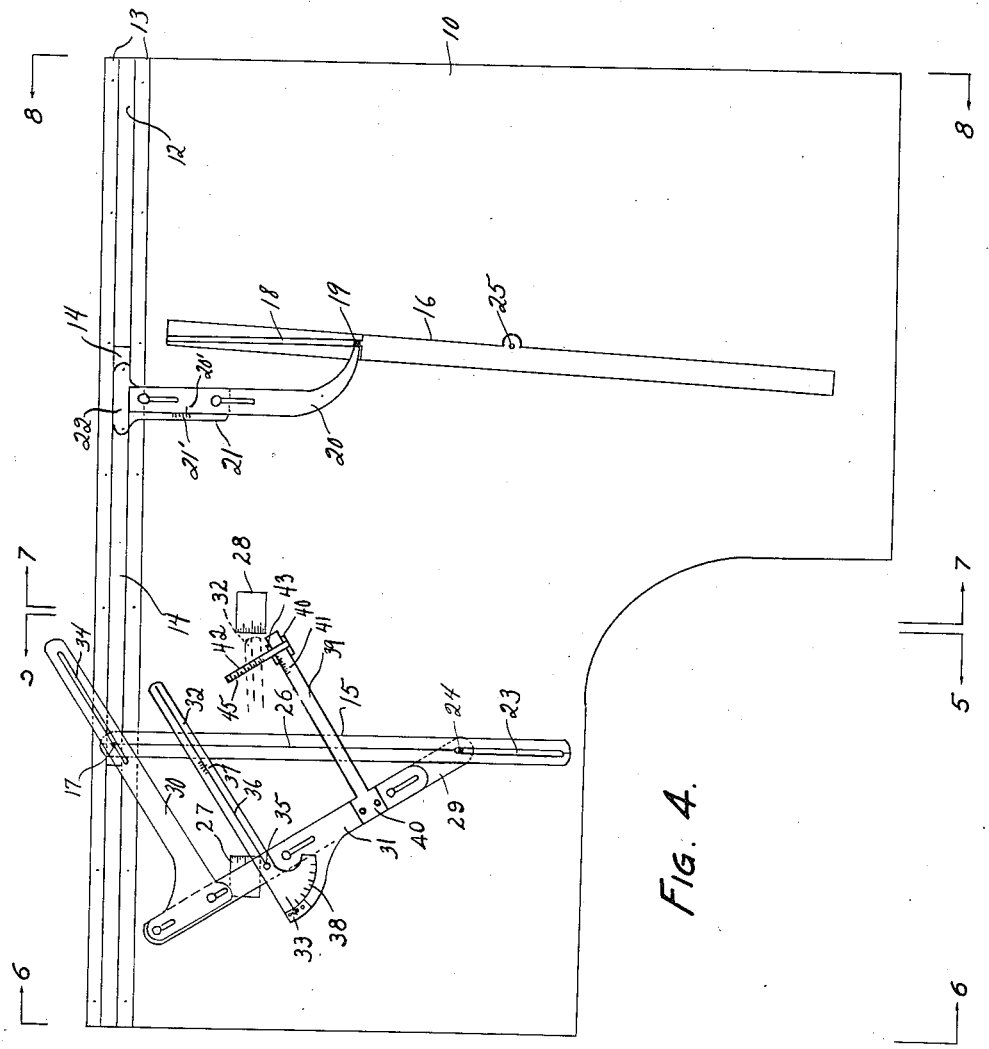
Figure 8:
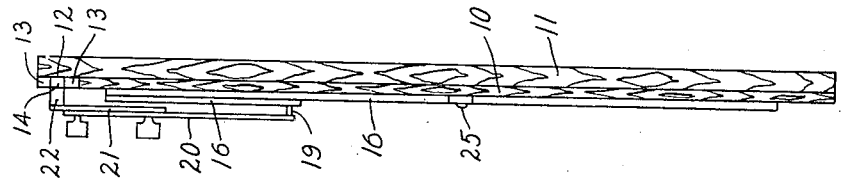
Figure 7:
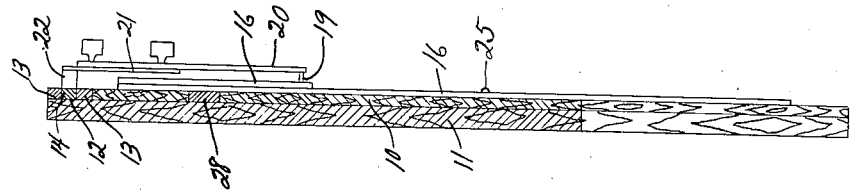
Figure 6:
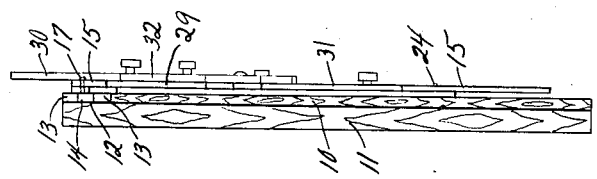
Figure 5:
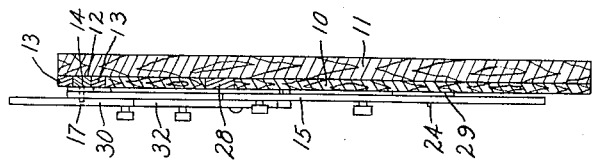

Figure 4 is a plan view of a preferred embodiment of my rectoblique plotter for determining the horizontal and vertical angles of an oblique aerial photograph for making topographic maps or planispheres; and Figures 5, 6, 7 and 8 are end and sectional views taken at lines 5—5, 6—6, 7—7 and 8—8 of Figure 4.

The instrument for accomplishing the purpose noted includes a simple mechanical arrangement consisting essentially of two bars or arms of different lengths. Each bar or arm is rotatably connected to a sliding link, free to move longitudinally in a line parallel to, or coinciding with, the horizon line of a photograph. Each bar or arm is also rotatable at another point on the bars themselves about a fixed pivot situated at a calculated perpendicular distance from the horizon line of the photograph. The bars or arms and associated elements to be described hereinafter are adapted to be mounted upon a drafting board or table. In use one bar, which may be referred to as a photo-arm, lies upon the photograph and describes angles represented in the oblique plane of the photograph, while the other bar, which may be referred to as a template arm, lying upon the map, will describe true angles in the horizontal plane, as measured from the plumb point, or nadir, of the camera station. Another linkage is provided for measuring directly the true vertical angles from the camera station to points shown in the photograph.

Figure 3:
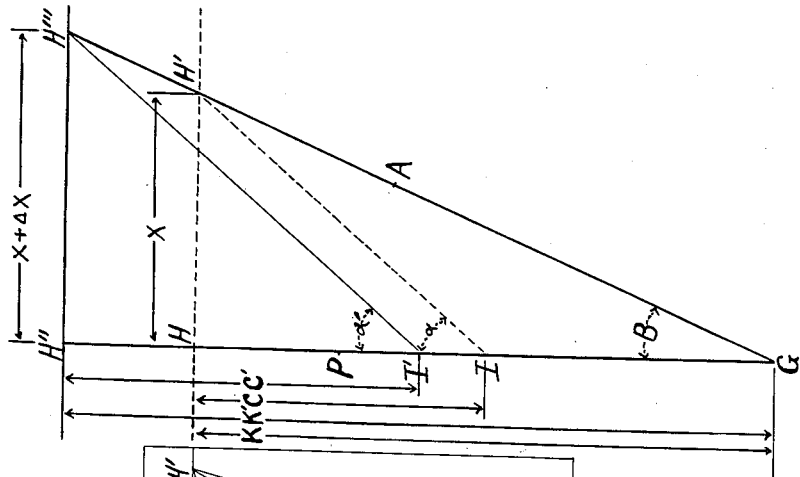
Figure 3 is a plot of horizontal angles of the Figure 2 plot illustrating the identity of angles when based upon a parallel to the horizon line.
Figure 2:
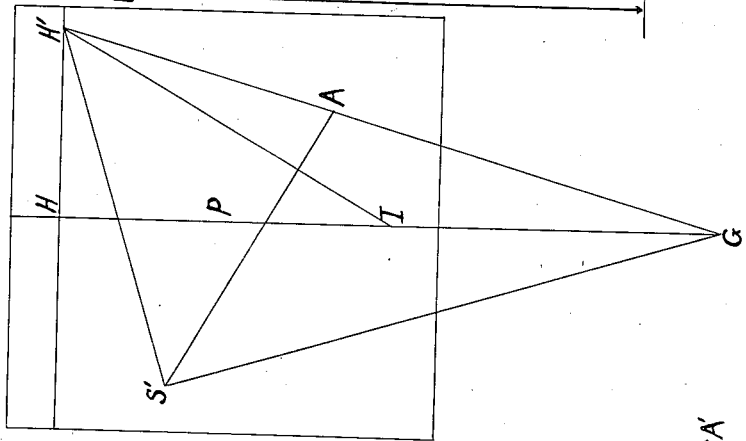
Figure 2 is a translation of the geometric relationships in Figure 1 to the plane of the oblique photograph as it would appear when the position of the photograph in Figure 1 is rotated about the photo plumb point G into plan.
Figure 1:
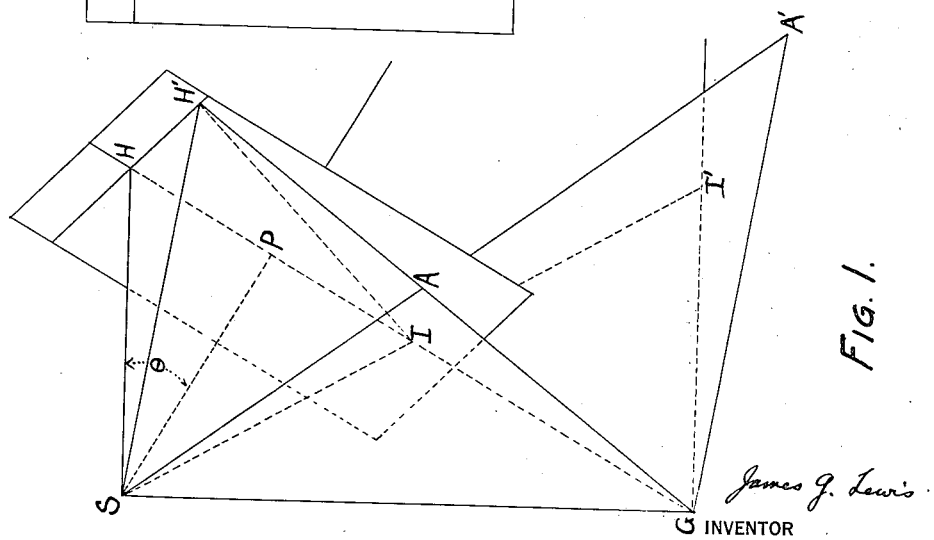
Figure 1 is a geometric plot based on an oblique aerial photograph of a given terrain for determination of horizontal angles from the nadir point and vertical angles at the camera station from the true horizon plane to image points shown on the photograph. In this figure the photograph is assumed to be in perspective and the plot based thereon is from such an angle.

Before describing the details of construction of my preferred embodiment and in order to explain the purpose, theory or method of operation, and function of my invention, reference is made to the exemplary plots of Figures 1 through 3 to which the following legend has been applied:

S—perspective center or camera station
P—principal point of oblique photograph
SP=f—focal length
I—isocenter
G—photo plumb point
HPIG—principal line of oblique
H'—intersection of horizon line with vertical plane through S, G, and A
HH'—intersection of true horizon plane through S with plane of oblique
A—any image point of oblique
A'—projection of A on horizontal plane through G
I'—projection of I on horizontal plane through G
θ—depression angle from horizontal plane.

By reference to Figure 1 it will be seen that it is apparent that for any one tilt angle and focal length the positions of H, P, I, and G become fixed in relation to S and the distances of P, I, and G from H can be determined thus:

$$HP = f \tan \theta$$

$$HI = \frac{f}{\cos \theta}$$

$$HG = \frac{f}{\sin \theta \cos \theta}$$

$$SG = \frac{f}{\sin \theta}$$

By way of illustration, the formula for HG is derived as follows: In triangles HSG and HSP angle HSP=θ, and angle HPS=90 degrees. Therefore, angle θ is a complement of angle SHP. Angle SGH is also a complement of angle SHP since angle HSG=90 degrees. Thus, angle HSP=angle $\theta$=angle SGP. Also, SP=f=focal length;

$$\cos\theta = \frac{f}{HS}$$

$$HS = \frac{f}{\cos\theta}$$

and $$\sin\theta = \frac{HS}{HG} = \frac{\frac{f}{\cos\theta}}{HG}$$

Hence, $$HG = \frac{f}{\sin\theta\cos\theta}$$

Further by way of illustration, the formula SG is derived as follows: In triangle SPG, $$\sin\theta = \frac{f}{SG}$$

Therefore, $$SG = \frac{f}{\sin\theta}$$

Any image point A of the oblique is selected and rays drawn from S through A to A' and from G through A to H'. H', S, G, A, and A' all lie in a vertical plane which passes through SG. H, S, G, I, and P also lie in a vertical plane, the principal vertical plane, passing through SG which is the axis of revolution of an infinite number of such planes, each of which will intersect the plane of the oblique in a line from G to some point on the true horizon line HH'. The vertical plane through A intersects the plane of the true horizon in line SH' and forms angle HSH' which is the dihedral angle between planes HSG and H'SG. Angle I'GA' is also the dihedral angle between these planes and therefore angle HSH'=angle I'GA' which is the horizontal angle at G between I' and A'. Thus any ray from G through an image point of the oblique will intersect the horizon line at some point which forms with S the true horizontal direction of point A' from G.

In order to get this horizontal angle in the plane of the oblique it is only necessary to locate S along HG at a distance of HS from H. It is not necessary to measure the distance SH, however, since HS=HI, and the required angle

HIH'=HSH' is obtained when I and H' are connected. As point H' moves along the true horizon line, IH' will represent true horizontal directions from G or the nadir point beneath the camera station to the ground position of points along the line GH'. It should be noted that displacement due to relief will be radial from point G. Thus any displacement of point A will be along line GH' and will not affect the horizontal angle HIH'.

The vertical angle from the true horizon plane to point A is represented by H'SA which is contained in the plane H'SG. It is desired to measure this angle in the plane of the oblique as was the case with the horizontal angle. It is, therefore, necessary to use line GH' as an axis of revolution and rotate plane H'SG about this axis until it coincides with the oblique plane, which may be more readily seen from an inspection of Figure 2. When this is done point S falls at S' and the vertical angle to point A will be H'S'A which can be measured directly in the plane of the oblique photograph. Point S' of Figure 2 can be located in the oblique plane for any position of GH' in the following manner.

Referring to the original vertical plane HSG of Figure 1:

Angle $HSG = 90°$ $$SG = \frac{f}{\sin\theta}$$

Angle $H'SG = 90°$

Since point S' of Figure 2 lies at a distance of $$\frac{f}{\sin\theta}$$

from G the locus of this point as H' moves along the horizon line will be a circle with a radius equal to $$\frac{f}{\sin\theta}$$

and center at G. Since angle GSH'=90° in Figure 1, angle GS'H' of Figure 2 also equals 90° and point S' lies on the circle with diameter GH' and the intersection of these two circles denotes S' and a line from S' through A forms the angle H'S'A which is the required vertical angle.

The foregoing discussion is a detailed explanation of a graphic solution for determining horizontal and vertical angles from oblique photographs and might be summed up as follows.

After locating the horizon line HH', G, and I in Figures 1 and 2 the horizontal angle to any point from the nadir point may be secured by drawing a line from G through the image point and intersecting the horizon line at some point H'. When this intersection point is connected to I the line IH' is an azimuth from the nadir point to the ground position of the point in question.

The vertical angle, as distinguished from the horizontal angle, to any point A can be obtained by describing a circle with G as center and SG as a radius and a second circle about GH' as a diameter; their intersection locates S'. When the latter is connected to H' and A the true vertical angle H'S'A is formed.

In the above described graphical solution or in a mechanical device based upon it, any change in the tilt angle $\theta$ or camera focal length $f$ will necessitate a change or an adjustment in the position of point G with reference to H. The following proof will establish the relationships which may be used so as to eliminate the adjustment in the distance HG.

In Figure 3, H''H''' is any line parallel to the true horizon line HH' and perpendicular to H''G at H''. This latter point is at a constant distance K' from G and therefore independent of changes in the tilt angle $\theta$ and the camera focal length $f$.

$$\tan B = \frac{X}{K} \qquad \tan \alpha' = \frac{X+\Delta X}{C'}$$

$$\tan \alpha = \frac{X}{C} \qquad \tan B = \frac{X+\Delta X}{K'}$$

$$\frac{\tan B}{\tan \alpha} = \frac{C}{K} \qquad \frac{\tan B}{\tan \alpha'} = \frac{C'}{K'}$$

$$\tan B = \frac{C}{K}\tan\alpha \qquad \tan B = \frac{C'}{K'}\tan\alpha'$$

Therefore $$\frac{C}{K}\tan\alpha = \frac{C'}{K'}\tan\alpha' \qquad (1)$$

and when $$\frac{C}{K} = \frac{C'}{K'}$$

$\tan\alpha = \tan\alpha'$ and $\alpha=\alpha'$

In (1) above solving for C':

$$C' = K'\frac{C}{K} \text{ or } C' = K'\sin\theta$$

Therefore, if I′ is located along HG at a distance equal to K′ sin θ from H″, then the line I′H‴ will represent a horizontal direction to the image points along the line GH‴.

A preferred form of the instrument is shown in Figures 4 through 8 which includes a drawing board 10 mounted upon a table or suitable supporting surface 11 and provided with a channel or guideway 12 formed in the drawing board or by groove-forming members 13 whose upper surfaces are preferably on a plane with the surface of the drawing board. A removable bar or sliding link 14 is slidably carried by the guideway along a fixed line for the operation of angle determining and angle converting means. The line along which the link is free to move longitudinally is parallel to or coincident with the horizon line of a photograph when properly placed upon the drawing board.

The angle determining and angle converting means include a photo-arm 15 and a template arm 16, the latter being of greater length than the former. One end of photo-arm 15 is pivotally connected to a point 17 on the sliding link 14 and similarly one end of template arm 16 is slidably pivoted by means of a slot 18 to point 19 on an arm 20 adjustably carried by a complementary arm 21 rigidly fixed to link 14 at point 22 predeterminately spaced from pivot point 17 of photo-arm 15. The other end of photo-arm 15 is slidably pivoted by means of slot 23 to a fixed pivot 24 and the template arm 16 is pivoted at a point 25. The pivot points 24 and 25 are situated at calculated perpendicular distances from the horizon line of a picture, or from a line parallel to the horizon line along which the link 14 is movable.

The photo-arm 15 is preferably transparent and provided with a hair line 26 along an extended portion of which the pivot point on the photo-arm 15 is slidable. The pivot point of photo-arm 15 is made slidable by the slotted engagement with fixed pivot 24. The movability of the pivot point of the photo-arm 15 is necessary since in the angular adjustment of the arm, the length of the arm between pivot points 17 and 24 would be increased over the length of the arm between those pivots when normal to the horizon line. The pivot point 19 on template arm 16 is also movable for the same reasons as just stated in connection with arm 15. The slot 18, however, by which the pivot point 19 on arm 16 is permitted to vary, is angularly disposed with respect to the edge of the arm 16 in order that the path, the slot, along which the pivot is movable be on a line with the fixed pivot 25 normal to the horizon line or line along which the link 14 is movable. Template arm 16 extends past pivot 25 so that the upper portion may be used for drawing horizontal rays for one oblique and the lower portion for the other oblique, therefore eliminating the necessity of reversing the map for each oblique. It will be noted that the edge of the arm 16 makes a constant angle with the line between pivot points 25 and 19 and if this edge is used in orienting the map it may then be used as a working edge.

Arm 20 is made adjustable in order that the value of the depression angle from the horizontal plane may be set up directly by an index mark 20′ provided on arm 20 for cooperation with graduations 21′ placed on complementary arm 21. Two metal plates 27 and 28 are fixed in the board as shown in Figure 4. These plates may be graduated for degree of tilt and a separate scale in inches for changes in focal length or simply one graduation in inches reading from the pivot point 24 may be used. If the latter scale is used it will be convenient to construct a table of values, see Figure 1, of $$PG = \frac{f}{\tan \theta}$$

for various tilt angles and focal lengths.

The vertical angle determining means include a plumb arm 29, a horizontal arm 30, pivot point 24, an adjustable plate 31, a vertical circle arm 32, and a vernier 33. One end of the plumb arm 29 is pivotally connected to pivot point 24 and the other end adjustably connected to the horizontal arm 30 so as to make 90° with the latter. The other end of arm 30 is slidably pivoted by means of slot 34 to the point 17 on the sliding link 14. The plate 31 is adjustably connected to the plumb arm 29 and carries the vertical circle arm 32 which is rotatable at point 35. The arm 32 is provided with graduations 37 to correspond to the camera focal length. The vernier 33 is rigidly fixed to the adjustable plate 31. The vertical circle arm 32 is preferably transparent and provided with a hair line 36, graduations for focal length at 37, and graduations 38 in degrees along the circular portion of the vertical circle arm 32.

After the tilt angle of a photograph has been computed and the position of the true horizon line determined, the following method of operation is used to determine the horizontal and vertical angles to image points.

The slidable link 14 is moved so that the photo-arm 15 is perpendicular to the slidable link. The photograph is placed on the board 10 under the photo-arm 15 in such a manner that the principal line, or line through the principal point perpendicular to the true horizon, coincides with the hair line 26 of photo-arm 15 when the latter is perpendicular to the sliding link 14. The photograph is then adjusted so that the principal point falls on a line connecting the graduation of plate 27 and the graduation of plate 28 corresponding to the predetermined degree of tilt. The photograph is then secured in position to the board. The adjustable arm 20 is moved so that the index mark 20′ falls opposite the graduation 21′ which corresponds to the predetermined tilt of the photograph. The vertical circle arm 32 is rotated about point 35 until the correct degrees of tilt are read on the graduations 38 of the vertical circle arm 32 and vernier 33. The adjustable plate 31 is then adjusted so that the hair line 36 of the vertical circle arm 32 makes 90° with the photo-arm 15 and also so that the principal point of the photograph falls on the graduation of 37 corresponding to the focal length of the taking camera. The horizontal arm 30 is then adjusted to the plumb arm 29 so that the slot 34 falls over the pivot point 17 on arm 14. The template arm 16 is removed from pivot 25 and the map or template, on which horizontal directions are to be drawn, is placed over the point 25 so that the nadir point on the map corresponding to the photograph to be worked is directly over point 25. Arm 16 is now placed over the map as before in contact with pivots 19 and 25. Orientation of the map with respect to the photograph is accomplished by rotating the map or template about point 25 until the edge of the template arm 16 is over the map position of an image along the hair line 26 of photo-arm 15. The map is then fastened to the board in any suitable manner.

To obtain the azimuth to any image point on the photograph the sliding link 14 is moved until the hair line 26 of the photo-arm 15 is over the image. The edge of the template arm 16 will be the desired azimuth and a line may be drawn on the map along this edge. To obtain the vertical angle at the camera station from the horizon plane to this image point, the vertical circle arm 32 is rotated until the hair line 36 is also over the image point. The angle is then read on the graduations 38 of vertical arm 32 and vernier 33.

The extended portion of template arm 16 below pivot point 25 may be used for laying out horizontal directions to image points on another oblique taken simultaneously from the same camera station.

The manner in which the rectoblique plotter is used in practice will depend on the nature of the job to be done. No explanation has been given for the manner of locating the horizon line or of determining the tilt angle since the method which might be used in any one case will depend on many factors such as availability of control, desired accuracy and time limitation.

For determinations of elevations of image points directly, the following means are provided.

A scale arm 39 is rigidly fixed at a calculated position to the adjustable plate 31 at 40 and makes a 90° angle with the plumb arm 29. The scale arm 39 contains graduations in inches or miles at 41 and carries a height indicator 42. The height indicator 42 is held perpendicular to the scale arm 39 by suitable means, such as shoes 43 and 44 which are movable along the scale arm 39 in constant angularity to any desired position. The height indicator 42 is provided with suitable graduations at 45.

To measure the relative height of an image point above a given datum plane the photo-arm 15 is moved until the hair line 26 is directly over the image. The height indicator 42 is then moved along the scale arm 39 to the graduation of 41 corresponding to the predetermined map distance of the image from the nadir point. The vertical circle arm 32 is also brought over the image point by using the hair line 36. This hair line 36 will then intersect the edge of the height indicator 42 and the elevation of the image can be read by means of the graduations at 45.

Having described my invention and illustrated an embodiment whereby the same may be practiced, what I claim is:

1. In a device for plotting maps from oblique photographs comprising a support including means for supporting a photograph and a mapping sheet in displaced relation in a single plane, a link member slidably mounted on said support for movement parallel to said plane, a pivot pin carried by said link member normal to said plane, a device for sighting along a photograph mounted on said support, said device being pivoted to said pivot pin and being provided with a longitudinal slot displaced radially from said pivot pin, and a second pivot pin mounted on said support and engaging the slot provided in said sighting device, a mapping arm pivoted to a pin fixedly mounted on said support normal thereto and displaced from said first mentioned pivot pins, said mapping arm extending from its fixedly mounted pivot pin toward said link in a predeterminately fixed angular relation to said sighting device and being provided with a slot extending radially with respect to its fixed pivot, an arm mounted on said link member displaced from said first mentioned pivot pin, and a pivot pin mounted on said arm normal to said plane engaging the slot provided in said mapping arm whereby when said sighting device is moved angularly an angular displacement is imparted to said mapping arm.

2. A device in accordance with claim 1 in which the arm mounted on said link member is adjustable to vary the distance of the pivot pin mounted thereon with respect to said link member.

3. A device in accordance with claim 1 including a plumb arm, said arm being pivoted on said second pivot pin, a horizontal arm mounted on said plumb arm perpendicular thereto, said horizontal arm being adjustable in position longitudinally with respect to said plumb arm while remaining perpendicular thereto, said horizontal arm being provided with a longitudinal slot therein, said slot engaging the first mentioned pivot pin carried by said link member, a plate mounted on said plumb arm, said plate being longitudinally adjustable with respect to said arm, a vertical angle measuring arm pivoted to the plate mounted on said plumb arm, and means for indicating the angular relationship of said vertical angle measuring arm with respect to said plumb arm.

4. A device in accordance with claim 1 including a plumb arm, said arm being pivoted on said second pivot pin, a horizontal arm mounted on said plumb arm perpendicular thereto, said horizontal arm being adjustable in position longitudinally with respect to said plumb arm while remaining perpendicular thereto, said horizontal arm being provided with a longitudinal slot therein, said slot engaging the first mentioned pivot pin carried by said link member, a plate mounted on said plumb arm, said plate being longitudinally adjustable with respect to said arm, a vertical angle measuring arm pivoted to the plate mounted on said plumb arm, and means for indicating the angular relationship of said vertical angle measuring arm with respect to said plumb arm, a scale mounted on said plate perpendicular to said plumb arm, said scale being provided with graduations, and a height indicator slidably mounted on said scale and extending in a direction perpendicular thereto, said height indicator being provided with graduations thereon.

5. In a device for plotting maps from oblique photographs comprising a support including means for supporting a photograph and a mapping sheet in displaced relation in a single plane, a link member slidably mounted on said support for movement parallel to said plane, a pivot pin carried by said link member normal to said plane, a device for sighting along a photograph mounted on said support, said device being pivoted to said pivot pin and being provided with a longitudinal slot displaced radially from said pivot pin, and a second pivot pin mounted on said support and engaging the slot provided in said sighting device, a mapping arm pivoted to a pin fixedly mounted on said support normal thereto and displaced from said first mentioned pivot pins, said mapping arm extending from its fixedly mounted pivot pin toward said link in a predeterminately fixed angular relation to said sighting device and being provided with a slot extending radially with respect to its fixed pivot, an arm mounted on said link member displaced from said first mentioned pivot, a pivot pin mounted on said arm normal to said plane engaging the slot provided in said mapping arm whereby when said sighting device is moved angularly an angular displacement is imparted to said mapping arm, a plumb arm, said arm being pivoted on said second pivot pin, a horizontal arm mounted on said plumb arm perpendicular thereto, said horizontal arm being adjustable in position longitudinally with respect to said plumb arm while remaining perpendicular thereto, said horizontal arm being provided with a longitudinal slot therein, said slot engaging the first mentioned pivot pin carried by said link member, a plate mounted on said plumb arm, said plate being longitudinally adjustable with respect to said arm, a vertical angle measuring arm pivoted to the plate mounted on said plumb arm, and means for indicating the angular relationship of said vertical angle measuring arm with respect to said plumb arm, a scale mounted on said plate perpendicular to said plumb arm, said scale being provided with graduations, a height indicator slidably mounted on said scale and extending in a direction perpendicular thereto, said height indicator being provided with graduations thereon, means for adjusting the effective length of the arm mounted on said link member to vary the distance of the pivot pin mounted thereon with respect to said link member, and a graduated scale mounted on said support for locating the principal point of a photograph to be used in mapping with respect to the fixed pivot of said sighting device.

6. In a device for plotting maps from oblique photographs comprising a support including means for supporting a photograph and a mapping sheet in displaced relation in a single plane, a link member slidably mounted on said support, a pivot pin carried by said link member, a first arm pivoted to said pivot pin, said arm being provided with a longitudinal slot displaced radially from said pivot pin, and a second pivot pin fixedly mounted on said support and engaging the slot provided in said arm, a second arm pivoted to a pin fixedly mounted on said support and displaced from said first mentioned pivot pins, said second arm extending in opposite directions from its fixedly mounted pivot pin and being provided with a slot in one end extending radially with respect to its fixed pivot, an arm mounted on said link member displaced from said first mentioned pivot pin, and a pivot pin mounted on said arm engaging the slot provided in said second arm whereby when said slidable link is moved angular displacement is imparted to each of said pivot arms.

7. A device in accordance with claim 6 in which the arm mounted on said link member is adjustable to vary the distance of the pivot pin mounted thereon with respect to said link member.

8. A device in accordance with claim 1 including a third pivoted arm, said arm being pivoted on said second pivot pin, an additional arm mounted on said third pivoted arm perpendicular thereto, said additional arm being adjustable in position longitudinally with respect to said third pivoted arm while remaining perpendicular thereto, said additional arm being provided with a longitudinal slot therein, said slot engaging the first mentioned pivot pin carried by said link member, a plate mounted on said third pivoted arm, said plate being longitudinally adjustable with respect to said arm, a fourth pivoted arm pivoted to the plate mounted on said third arm, and means for indicating the angular relationship of said fourth arm with respect to said third arm.

9. A device in accordance with claim 1 including a third pivoted arm, said arm being pivoted on said second pivot pin, an additional arm mounted on said third pivoted arm perpendicular thereto, said additional arm being adjustable in position longitudinally with respect to said third pivoted arm while remaining perpendicular thereto, said additional arm being provided with a longitudinal slot therein, said slot engaging the first mentioned pivot pin carried by said link member, a plate mounted on said third pivoted arm, said plate being longitudinally adjustable with respect to said arm, a fourth pivoted arm pivoted to the plate mounted on said third arm, and means for indicating the angular relationship of said fourth arm with respect to said third arm, a scale mounted on said plate perpendicular to said third arm, said scale being provided with graduations and a height indicator slidably mounted on said scale and extending in a direction perpendicular thereto, said height indicator being provided with graduations thereon.

10. In a device for plotting maps from oblique photographs comprising a support including means for supporting a photograph and a mapping sheet in parallel planes, a link member slidably mounted on said support for movement parallel to said plane, a pivot pin carried by said link member, a first arm overlying one of said planes, said arm being pivoted to said pivot pin, and being provided with a longitudinal slot displaced radially from said pivot pin and a second pivot pin fixedly mounted on said support and engaging the slot provided in said arm, a second arm overlying the other one of said planes said arm being pivoted to a pin fixedly mounted on said support and displaced from said first mentioned pivot pins, said second arm extending in opposite directions from its fixedly mounted pivot pin and being provided with a slot in one end extending radially with respect to its fixed pivot, an arm mounted on said link member displaced from said first mentioned pivot pin, and a pivot pin mounted on said arm engaging the slot provided in said second arm whereby when said slidable link is moved angular displacement is imparted to each of said pivot arms.

11. A device in accordance with claim 10 in which the arm mounted on said link member is adjustable to vary the distance of the pivot pin mounted therewith with respect to said link member.

12. A device in accordance with claim 6 including a third pivoted arm, said arm being pivoted on said second pivot pin, an additional arm mounted on said third pivoted arm perpendicular thereto, said additional arm being adjustable in position longitudinally with respect to said third pivoted arm while remaining perpendicular thereto, said additional arm being provided with a longitudinal slot therein, said slot engaging the first mentioned pivot pin carried by said link member, a plate mounted on said third pivoted arm, said plate being longitudinally adjustable with respect to said arm, a fourth pivoted arm pivoted to the plate mounted on said third, arm, and means for indicating the angular relationship of said fourth arm with respect to said third arm.

13. A device in accordance with claim 6 including a third pivoted arm, said arm being pivoted on said second pivot pin, an additional arm mounted on said third pivoted arm perpendicular thereto, said additional arm being adjustable in position longitudinally with respect to said third pivoted arm while remaining perpendicular thereto, said additional arm being provided with a longitudinal slot therein, said slot engaging the first mentioned pivot pin carried by said link member, a plate mounted on said third pivoted arm, said plate being longitudinally adjustable with respect to said arm, a fourth pivoted arm pivoted to the plate mounted on said third arm, and means for indicating the angular relationship of said fourth arm with respect to said third arm, a scale mounted on said plate perpendicular to said fourth arm, said scale being provided with graduations and a height indicator slidably mounted on said scale and extending in a direction perpendicular thereto, said height indicator being provided with graduations thereon.

14. In a device for plotting maps from oblique photographs comprising a support including means for supporting a photograph and a mapping sheet in displaced relation in a single plane, a link member slidably mounted on said support for movement parallel to said plane, a device for sighting along a photograph mounted on said support, said device being pivoted to said link at a predetermined point and being provided with a longitudinal slot displaced radially from said pivot point, guide means mounted on said support at a predetermined point and engaging the slot provided in said sighting device, a mapping arm pivoted to said support at a predetermined point displaced from said first mentioned pivot points, said mapping arm extending from its pivot point toward said link in a predeterminately fixed angular relation to said sighting device and being provided with a slot extending radially with respect to its pivot point, an arm mounted on said link member displaced from said first mentioned pivot point, and guide means mounted on said arm engaging the slot provided in said mapping arm whereby when said sighting device is moved angularly an angular displacement is imparted to said mapping arm.

15. A device in accordance with claim 14 in which the arm mounted on said link member is adjustable to vary the distance of the guide means mounted thereon with respect to said link member.

16. A device in accordance with claim 14 including a plunb arm, said arm being pivoted to the guide means on the support, a horizontal arm mounted on said plumb arm perpendicular thereto, said horizontal arm being adjustable in position longitudinally with respect to said plumb arm while remaining perpendicular thereto, said horizontal arm being provided with a longitudinal slot therein, said slot engaging said link at said first mentioned pivot point, a plate mounted on said plumb arm, said plate being longitudinally adjustable with respect to said arm, a vertical angle measuring arm pivoted to the plate mounted on said plumb arm, and means for indicating the angular relationship of said vertical angle measuring arm with respect to said plumb arm.

17. A device in accordance with claim 14 including a plumb arm, said arm being pivoted on the guide means of the support, a horizontal arm mounted on said plumb arm perpendicular thereto, said horizontal arm being adjustable in position longitudinally with respect to said plumb arm while remaining perpendicular thereto, said horizontal arm being provided with a longitudinal slot therein, said slot engaging said link at said first mentioned pivot point, a plate mounted on said plumb arm, said plate being longitudinally adjustable with respect to said arm, a vertical angle measuring arm pivoted to the plate mounted on said plumb arm, and means for indicating the angular relationship of said vertical angle measuring arm with respect to said plumb arm, a scale mounted on said plate perpendicular to said plumb arm, said scale being provided with graduations, and a height indicator slidably mounted on said scale and extending in a direction perpendicular thereto, said height indicator being provided with graduations thereon.

JAMES G. LEWIS.